Figure 1:
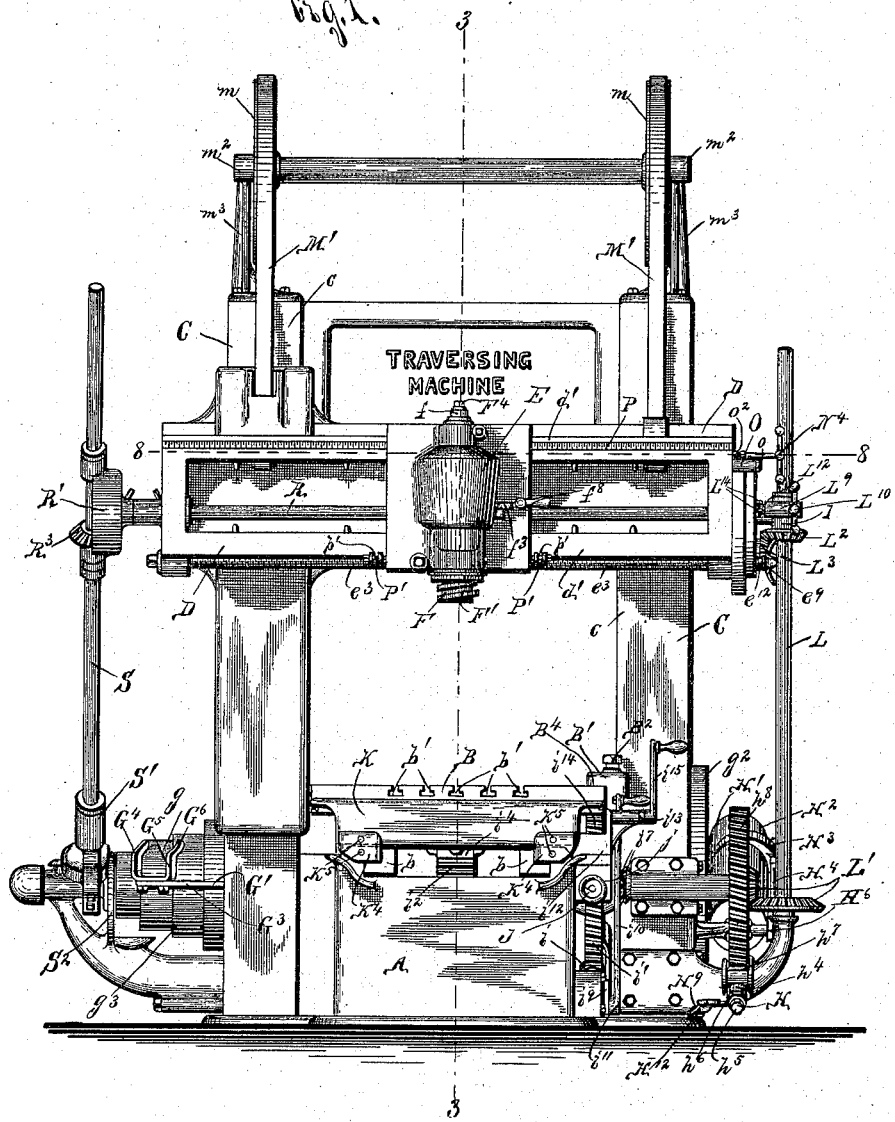

(No Model.) 13 Sheets—Sheet 1.

J. E. SWEET.
TRAVERSING MACHINE.

No. 565,642. Patented Aug. 11, 1896.

WITNESSES:
H. E. Chase
W. H. Randall

INVENTOR
John E. Sweet
BY
Wilkinson & Parsons
ATTORNEYS.

(No Model.)  13 Sheets—Sheet 2.
J. E. SWEET.
TRAVERSING MACHINE.

No. 565,642.  Patented Aug. 11, 1896.

WITNESSES:
INVENTOR
ATTORNEYS (No Model.)  
13 Sheets—Sheet 3.

J. E. SWEET.
TRAVERSING MACHINE.

No. 565,642.  
Patented Aug. 11, 1896.

WITNESSES:

INVENTOR

BY

ATTORNEYS.

(No Model.) 13 Sheets—Sheet 4.

J. E. SWEET.
TRAVERSING MACHINE.

No. 565,642. Patented Aug. 11, 1896.

WITNESSES:
H. E. Chase
W. H. Randall

INVENTOR
John E. Sweet
BY
Hey Wilkinson Parsons
ATTORNEYS

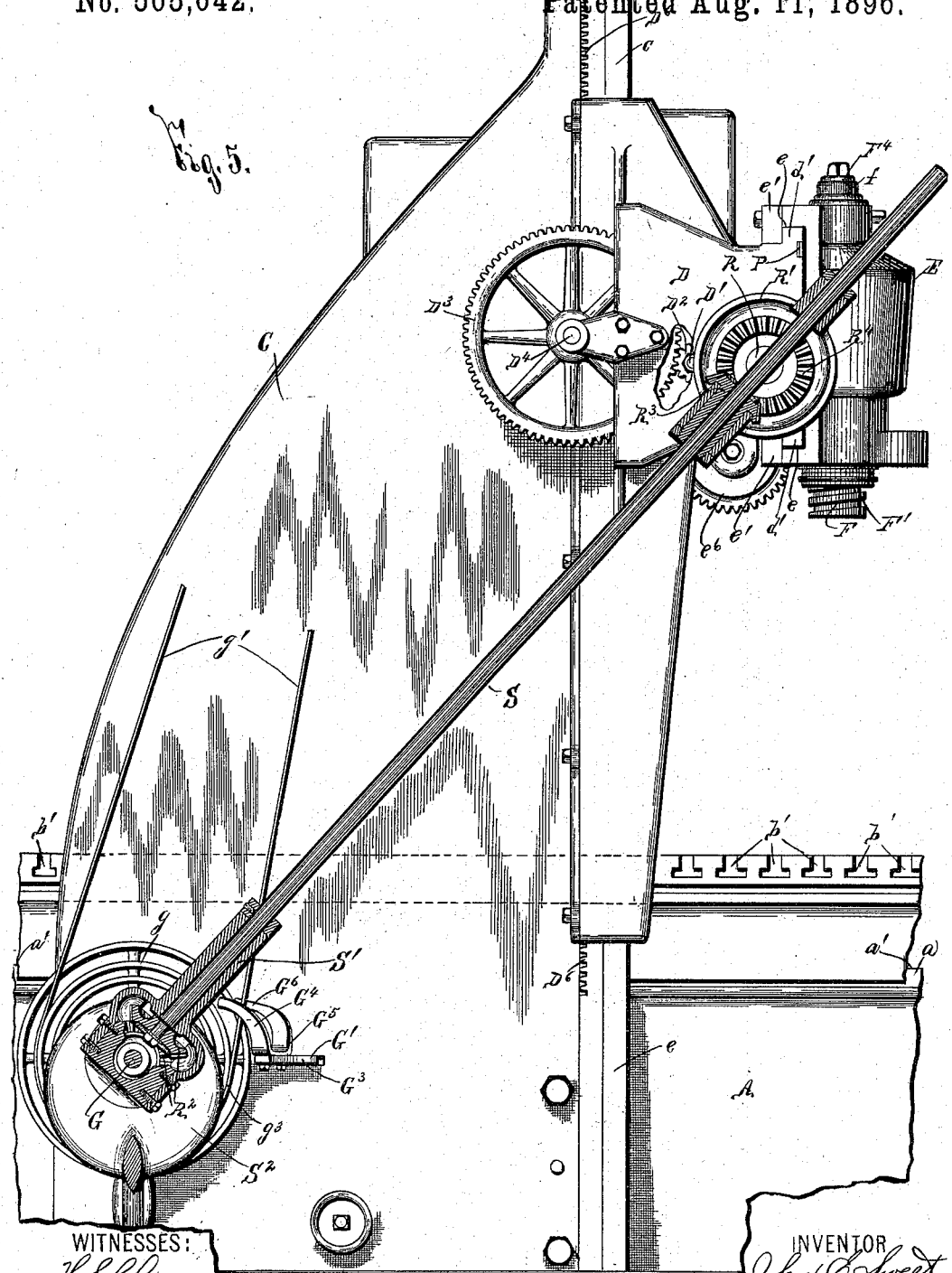

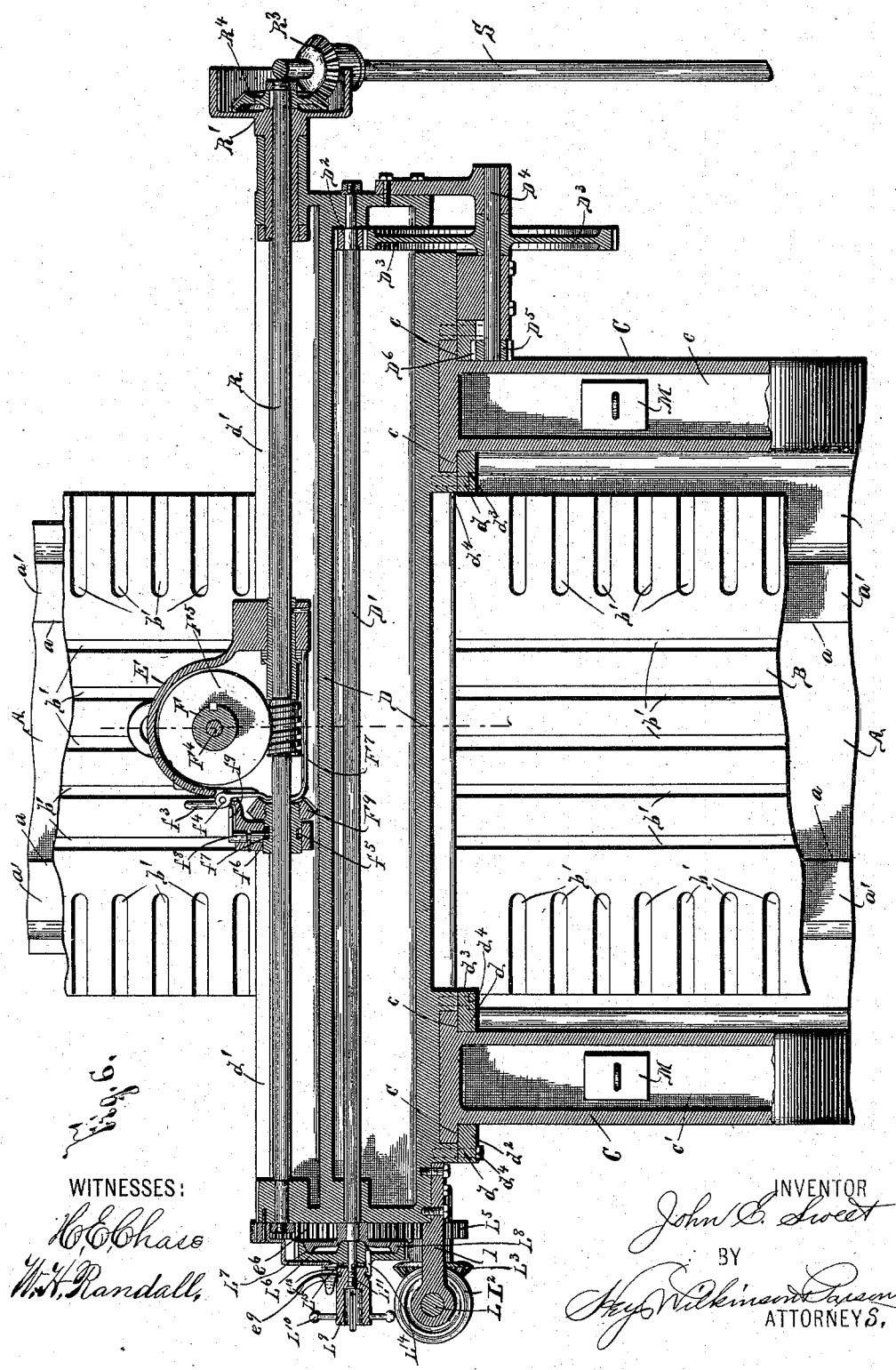

(No Model.) 13 Sheets—Sheet 7.
J. E. SWEET.
TRAVERSING MACHINE.
No. 565,642. Patented Aug. 11, 1896.
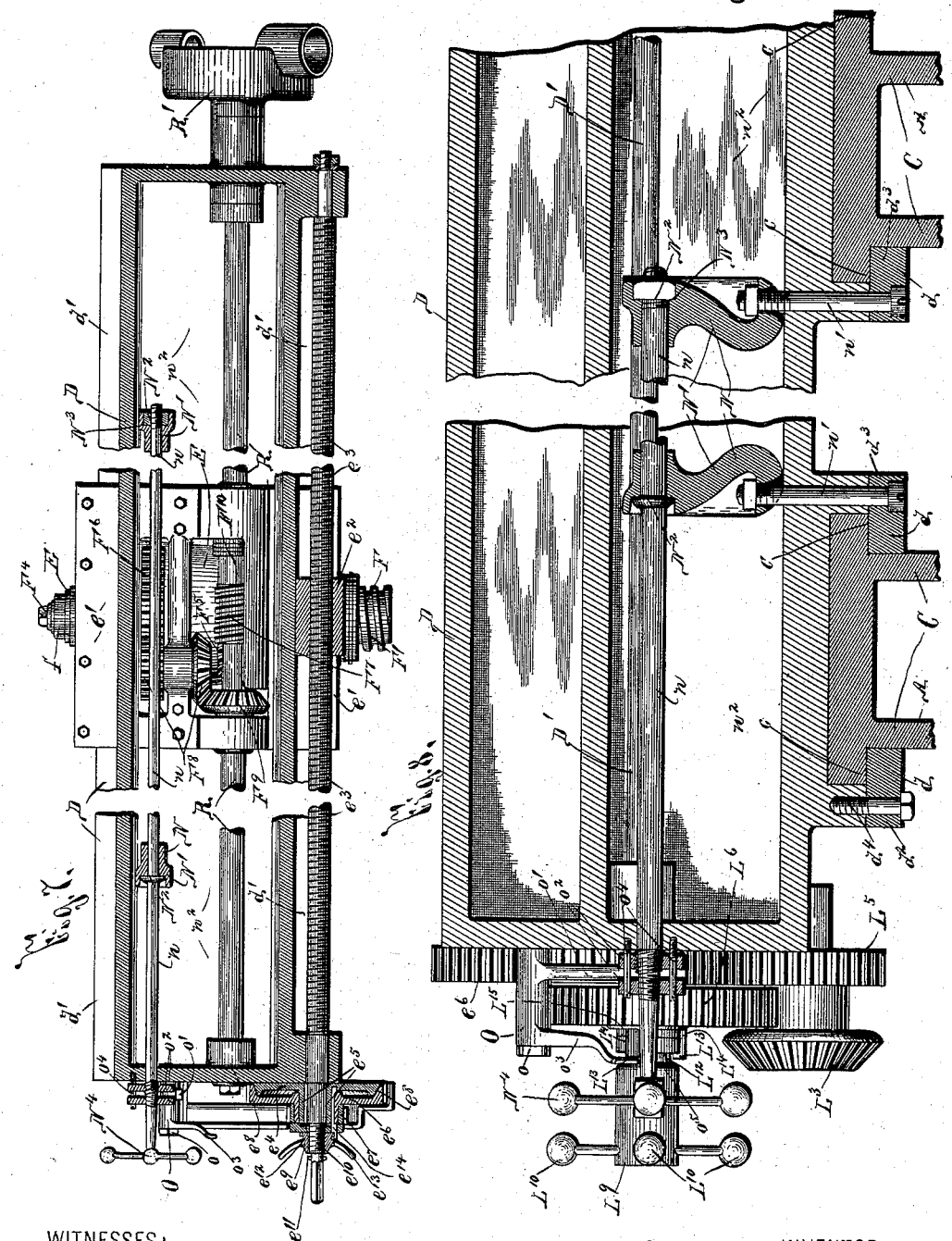
WITNESSES:
INVENTOR
John E. Sweet
BY
ATTORNEYS.

(No Model.) 13 Sheets—Sheet 8.

J. E. SWEET.
TRAVERSING MACHINE.

No. 565,642. Patented Aug. 11, 1896.

WITNESSES:
H. E. Chase,
W. H. Randall,

INVENTOR
John E. Sweet
BY
Wilkinson & Parsons
ATTORNEYS.

(No Model.) 13 Sheets—Sheet 9.
J. E. SWEET.
TRAVERSING MACHINE.
No. 565,642. Patented Aug. 11, 1896.
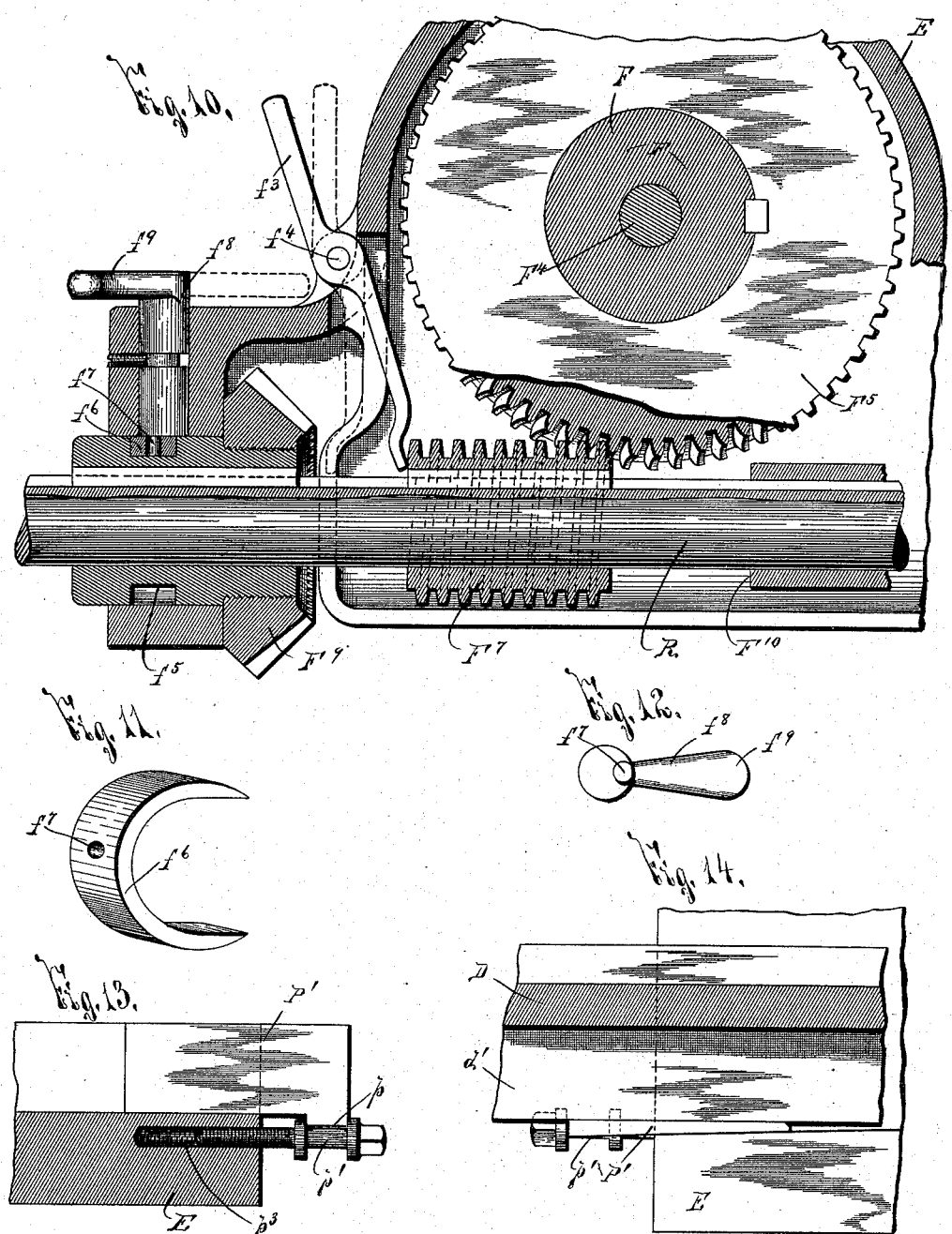
WITNESSES:
H. E. Chase
W. H. Randall
INVENTOR
John E. Sweet
BY
Hay, Wilkinson and Parsons
ATTORNEYS.

(No Model.)
13 Sheets—Sheet 10.
J. E. SWEET.
TRAVERSING MACHINE.
No. 565,642.  Patented Aug. 11, 1896.
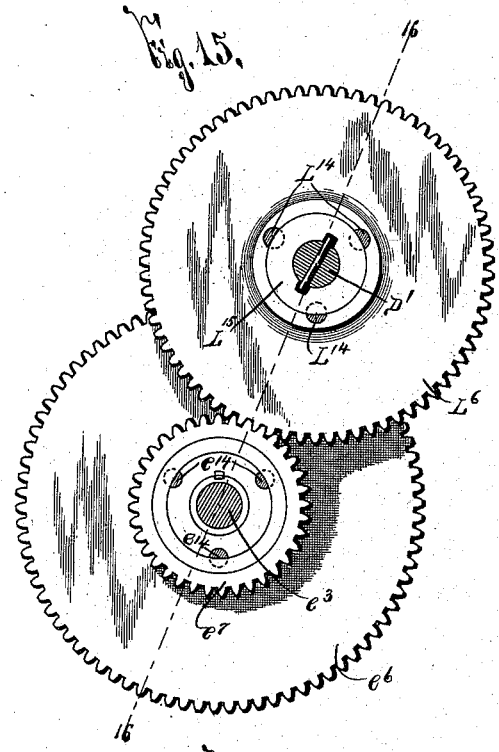
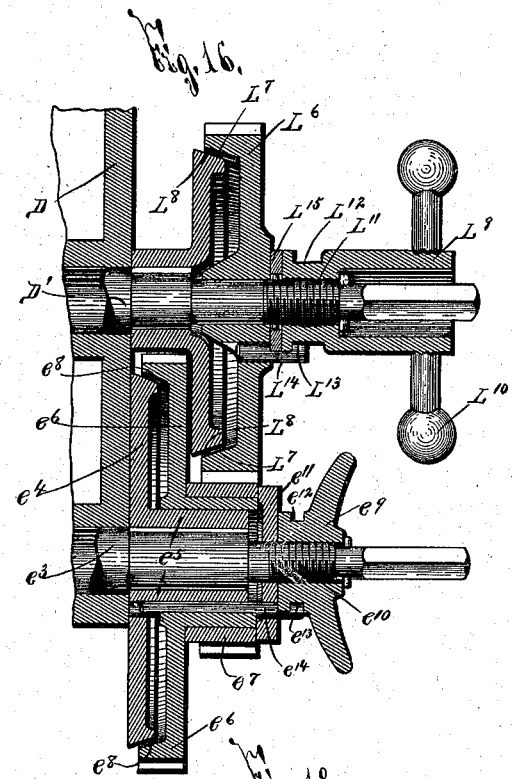
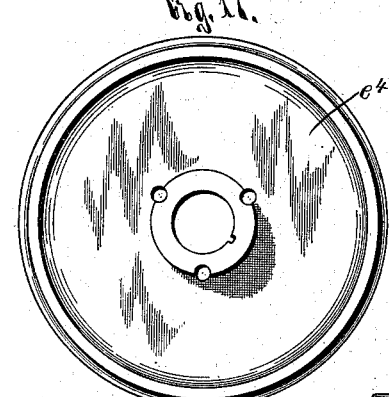
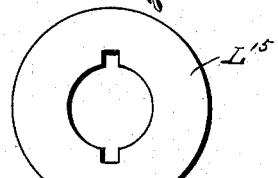
WITNESSES:
H. E. Chase
W. H. Randall
INVENTOR
John E. Sweet
BY
Hey Wilkinson Owens
ATTORNEYS
THE NORRIS PETERS CO., PHOTO-LITHO., WASHINGTON, D. C.

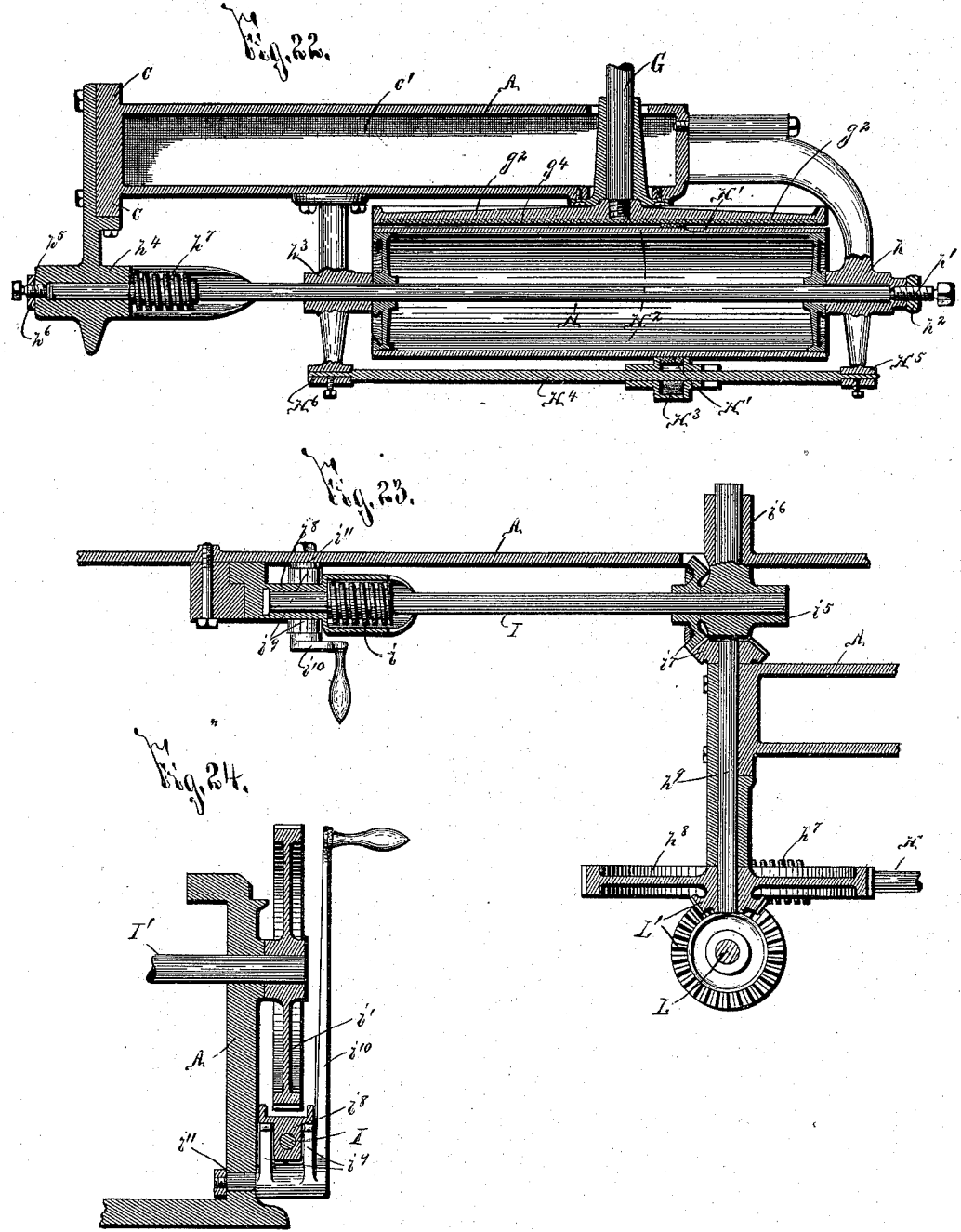

(No Model.) 13 Sheets—Sheet 12.

J. E. SWEET.
TRAVERSING MACHINE.

No. 565,642. Patented Aug. 11, 1896.

WITNESSES:
H. E. Chase
W. F. Randall

INVENTOR
John E. Sweet
BY
Hey Wilkinson Parsons
ATTORNEYS

THE NORRIS PETERS CO., PHOTO-LITHO., WASHINGTON, D. C.

(No Model.)  13 Sheets—Sheet 13.
J. E. SWEET.
TRAVERSING MACHINE.
No. 565,642.  Patented Aug. 11, 1896.
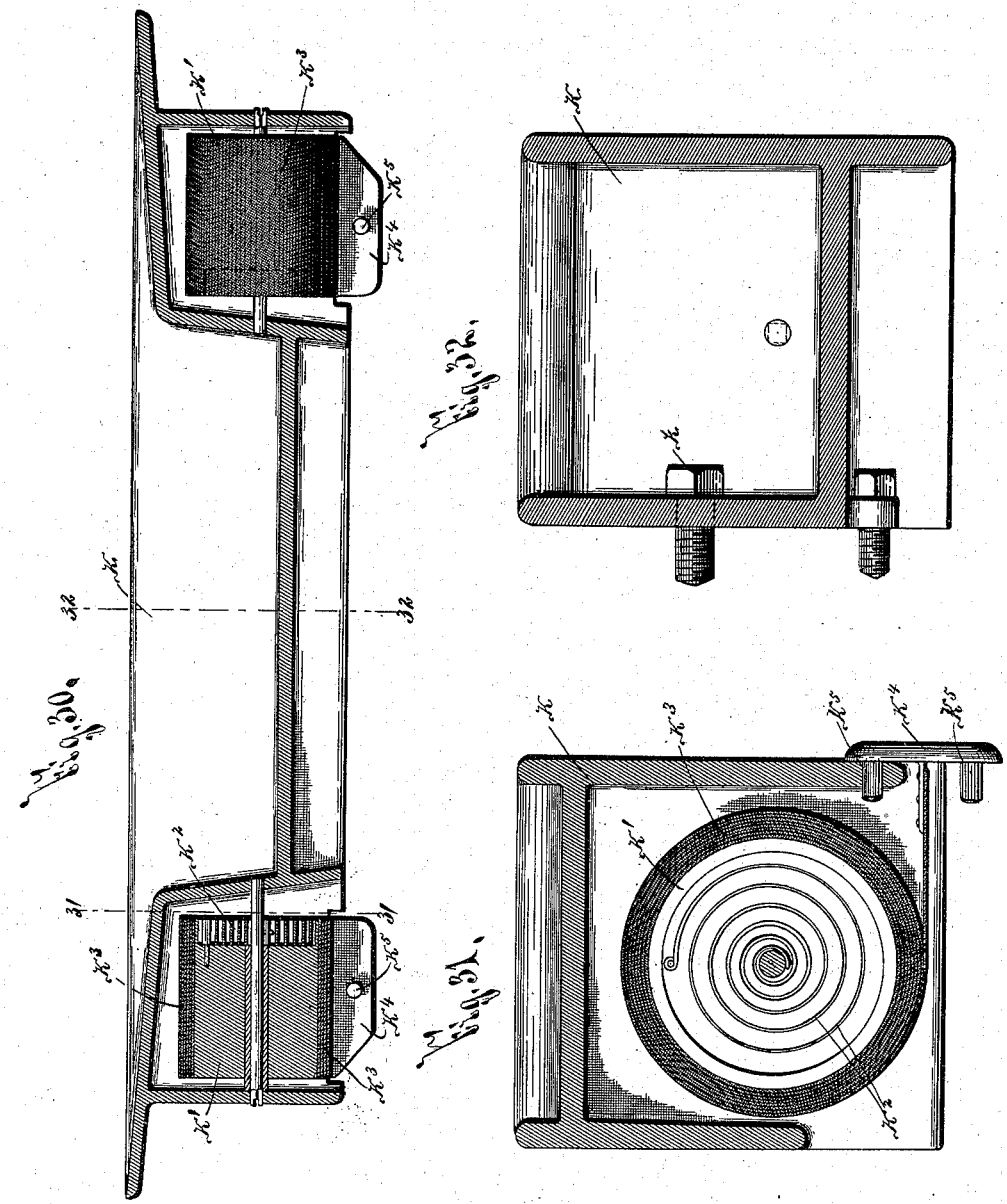
WITNESSES:
H. E. Chase
W. H. Randall
INVENTOR
John E. Sweet
BY
Hey Wilkinson Parsons
ATTORNEYS.

UNITED STATES PATENT OFFICE.

JOHN E. SWEET, OF SYRACUSE, NEW YORK, ASSIGNOR TO THE PRATT & WHITNEY COMPANY, OF HARTFORD, CONNECTICUT.

TRAVERSING-MACHINE.

SPECIFICATION forming part of Letters Patent No. 565,642, dated August 11, 1896.

Application filed July 23, 1891. Serial No. 400,512. (No model.)

*To all whom it may concern:*

Be it known that I, JOHN E. SWEET, of Syracuse, in the county of Onondaga, in the State of New York, have invented new and useful Improvements in Traversing-Machines, of which the following, taken in connection with the accompanying drawings, is a full, clear, and exact description.

My invention relates to improvements in traversing-machines, and has for its object the production of a simple, effective, and practical device of great and varied capacity for working metals and like materials economically and accurately; and to this end it consists, essentially, in a single machine of certain peculiar and applicable mechanisms, in the particular arrangement and adaptation of the component parts, and in the detail construction and arrangement of the parts, all as hereinafter more particularly described, and pointed out in the claims.

In describing this invention reference is had to the accompanying drawings, forming a part of this specification, in which like letters indicate corresponding parts in all the views.

Figure 2:
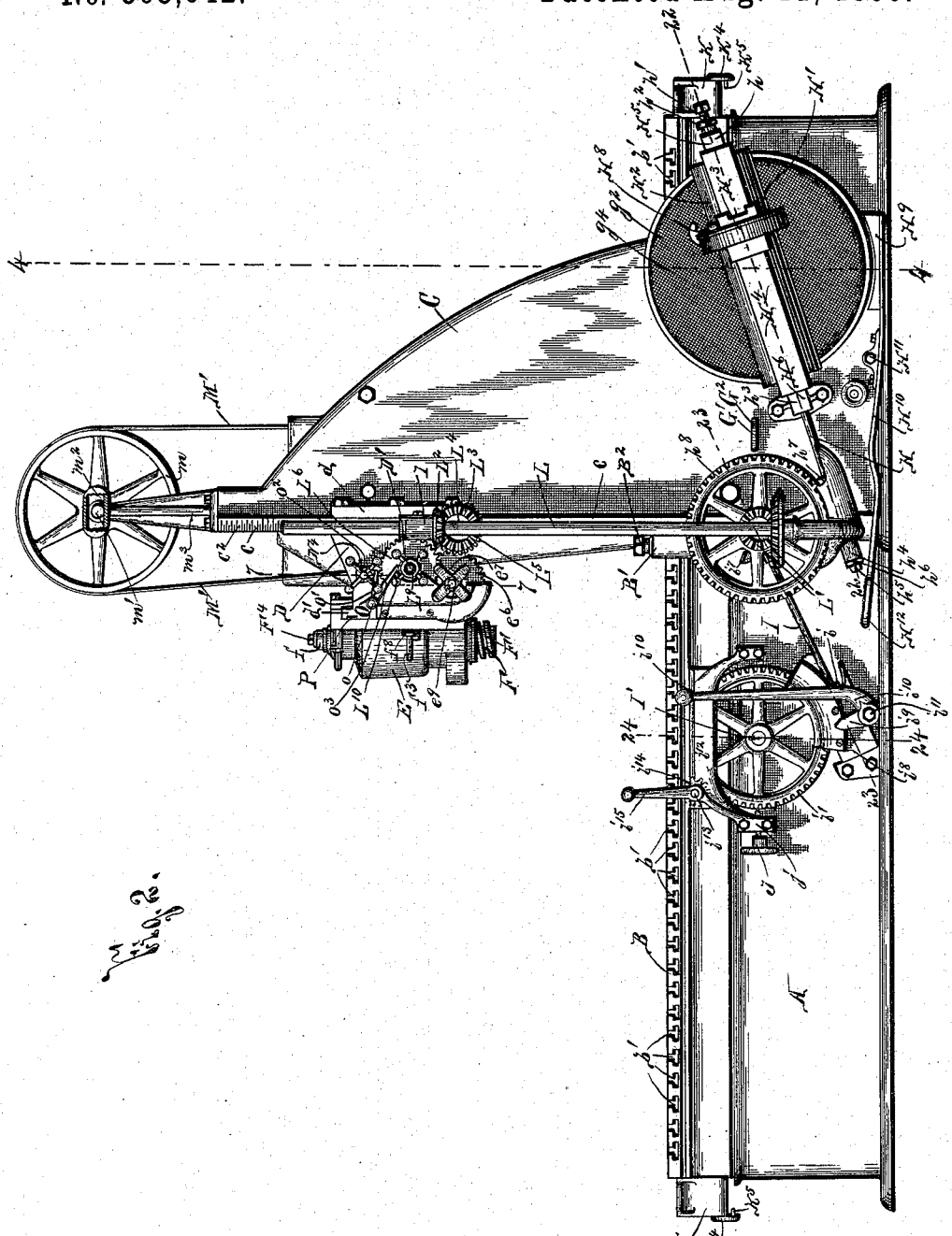
Figure 3:
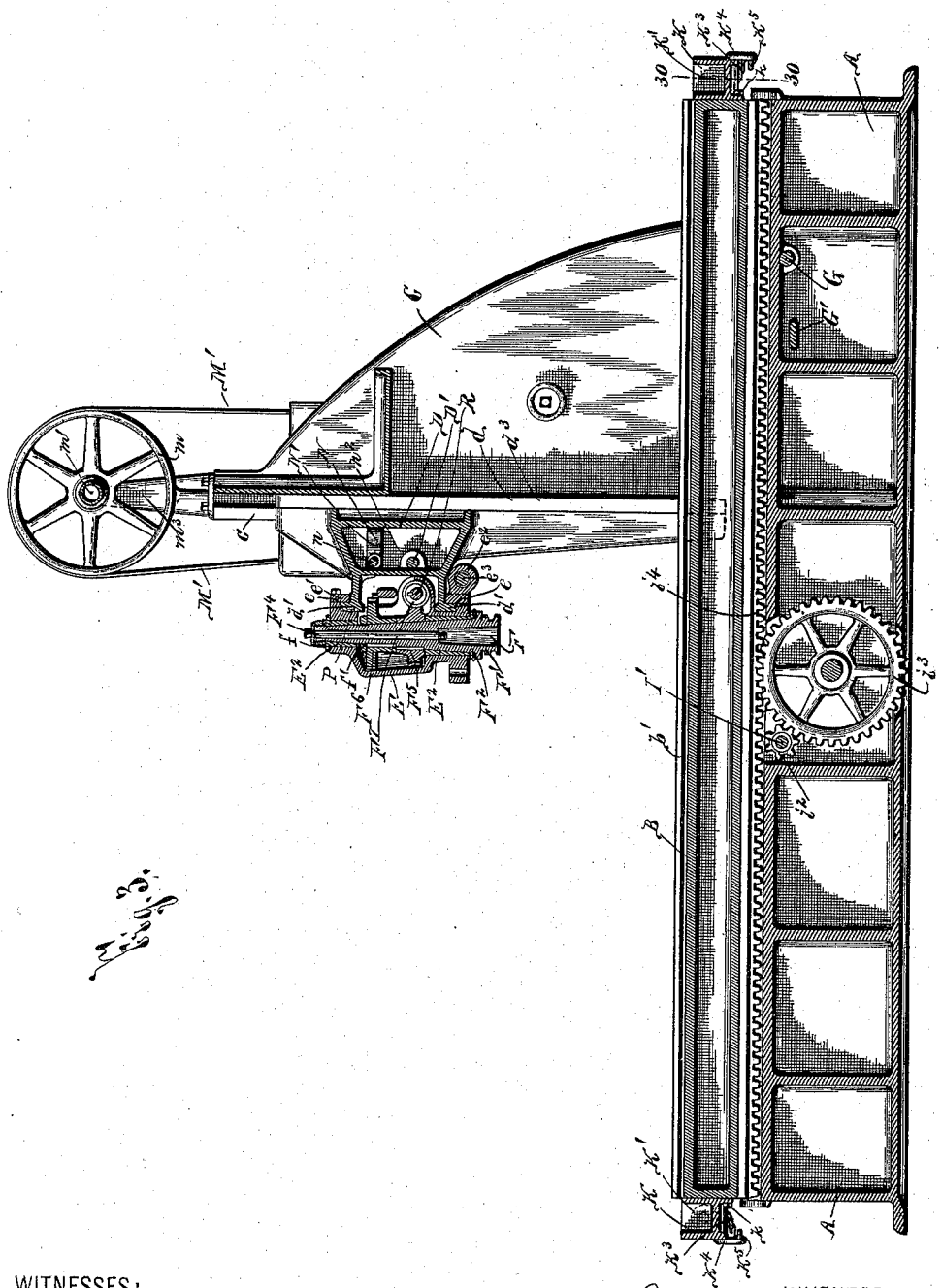
Figure 4:
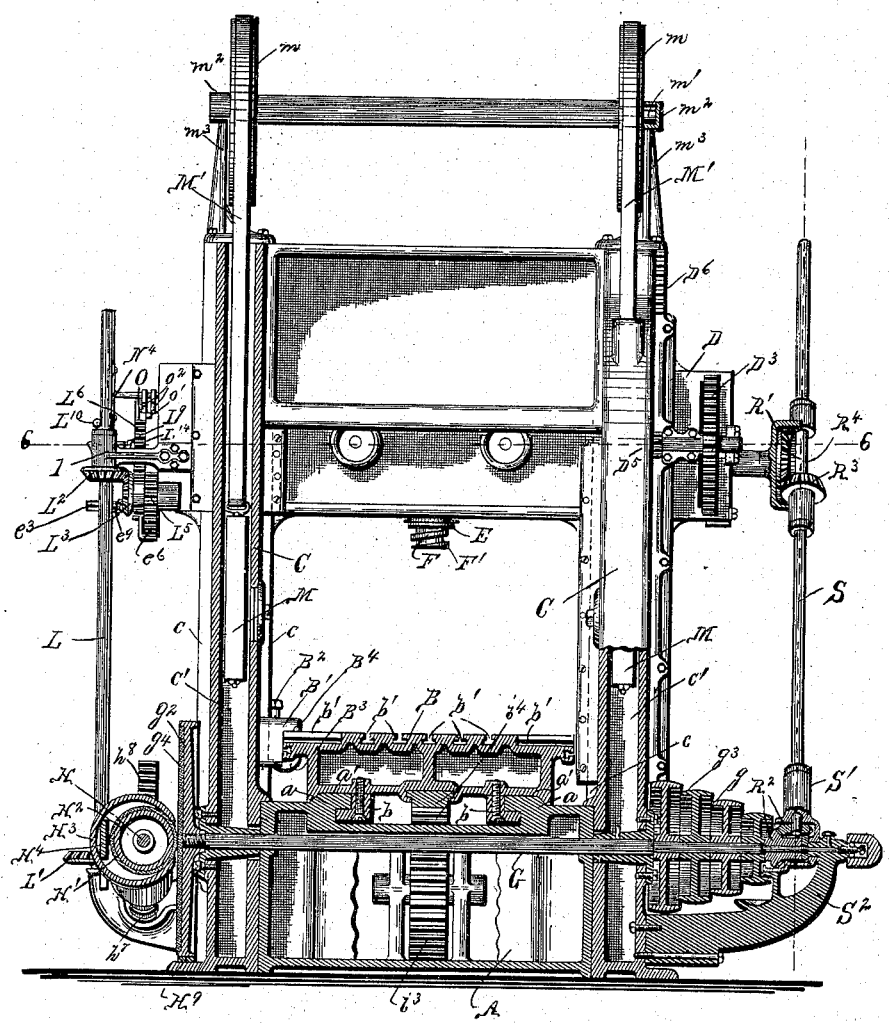
Figure 9:
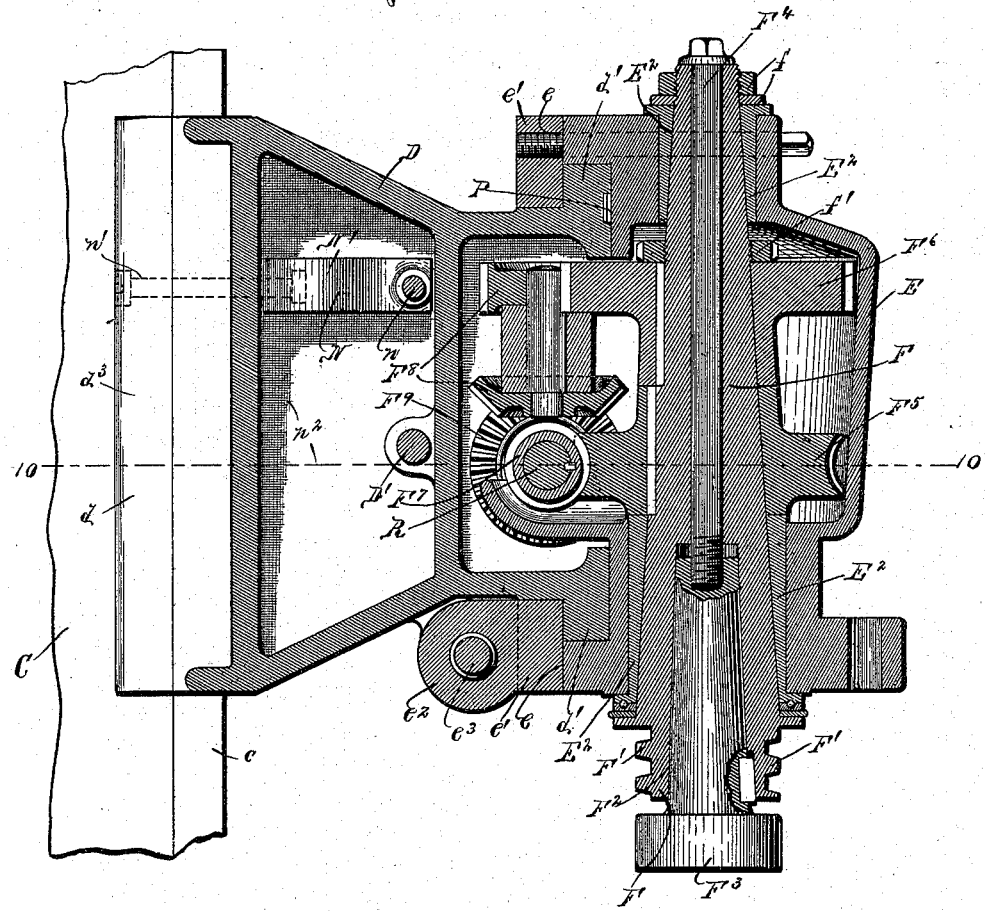
Figure 25:
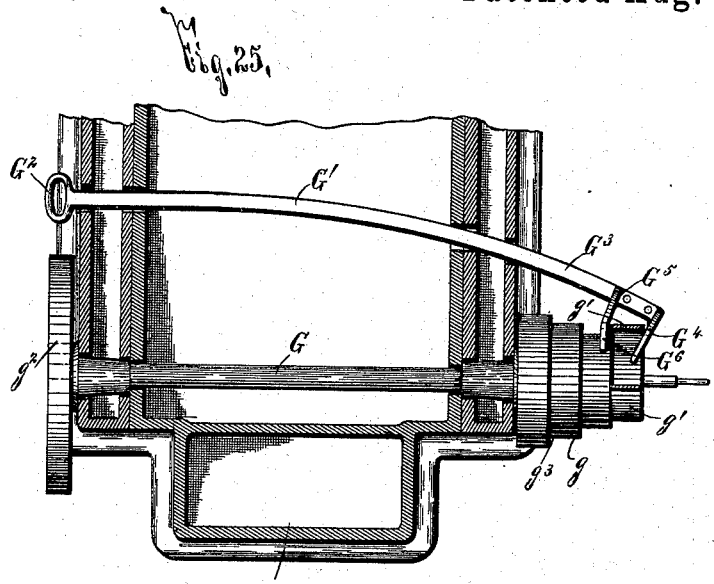
Figure 26:
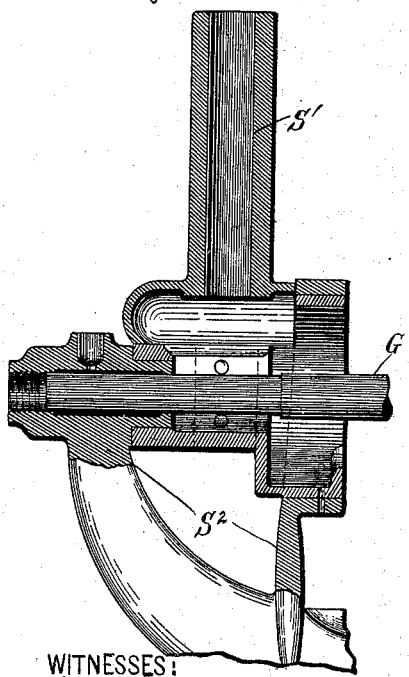
Figure 27:
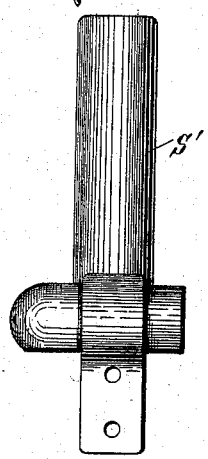
Figure 28:
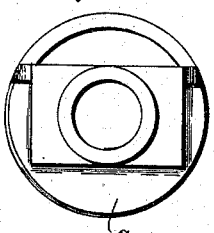
Figure 29:
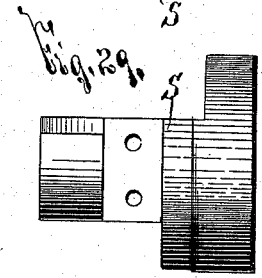

Figures 1 and 2 are respectively front and side elevations of my improved invention, illustrating its general arrangement and construction. Fig. 3 is a longitudinal vertical sectional view, taken on line 3 3, Fig. 1, showing the construction of the frame, the movable bed-plate and gearing for moving the same, the revolving tool-carrying spindle, its supporting-carriage, the cross-head upon which said carriage is movable, the guides on the frame for the cross-head, and the flexible belt to which are connected the counterbalances for the cross-head. Fig. 4 is a transverse vertical sectional view, taken on line 4 4, Fig. 2, illustrating particularly the main shaft and the intermediary shafts for transmitting motion to the cross-head and the revolving tool-carrying spindle. Fig. 5 is an enlarged elevation of a portion of the opposite side of the frame to that shown at Fig. 3, illustrating particularly the construction of the inclined intermediary shaft for transmitting motion from the main shaft to the tool-supporting spindle in order to revolve the same. Fig. 6 is an enlarged horizontal sectional view, taken on line 6 6, Fig. 4, showing in section a portion of the frame, a top plan view of a portion of the bed-plate, and the shafts for transmitting motion to the vertically-revolving tool-carrying spindle and to the cross-head for raising and lowering the same. Fig. 7 is an enlarged horizontal sectional view, partly broken away, taken on line 7 7, Fig. 2, illustrating the lock for retaining the movable cross-head in its adjustment and the screw-threaded shaft for feeding the tool-support carriage transversely on the cross-head. Fig. 8 is an enlarged horizontal sectional view, taken on line 8 8, Fig. 1, illustrating particularly the detail construction and arrangement of the lock for retaining the cross-head in its adjusted position. Fig. 9 is an enlarged transverse vertical sectional view, taken on the same section-line as Fig. 3, illustrating the detail construction and arrangement of the tapering tool-carrying spindle and the separate sets of gearing for revolving the same at differential speed. Fig. 10 is a horizontal sectional view, taken on line 10 10, Fig. 9, also illustrating the gearing for transmitting motion to the tool-carrying spindle. Figs. 11 and 12 are respectively isometric perspective and elevation of portions of the mechanisms shown in Fig. 10. Figs. 13 and 14 are detail sectional views of the adjustable gib for the tool-support carriage. Fig. 15 is an enlarged elevation of the detached gearing for transmitting motion to the screw-threaded shaft or feed for moving the tool-support carriage along the cross-head and to the shaft or feed for moving the cross-head along its guides upon the frame. Fig. 16 is a sectional view taken on line 16 16, Fig. 15. Figs. 17, 18, 19, 20, and 21 are elevations of detail parts best seen in Figs. 15 and 16. Fig. 22 is an enlarged horizontal sectional view, taken on line 22 22, Fig. 2, showing the disk on the main shaft, the supplemental shaft in proximity to said disk, and the movable frictional band mounted on said shaft for transmitting motion thereto from the former disk. Fig. 23 is an enlarged sectional view, taken on line 23 23, Fig. 2, showing particularly the second supplemental shaft for transmitting motion from the first supplemental shaft to the gearing for moving the bed-plate. Fig. 24 is a transverse vertical sectional view, taken on line 24 24, Fig. 2, illustrating the lever for raising and lowering the end of the second supplemental shaft, so as to throw the bed-plate into and out of movement. Fig. 25 is an enlarged horizontal sectional view representing the belt-shifter. Fig. 26 is an enlarged vertical sectional view of the sleeve pivoted upon the frame for supporting the shaft for transmitting motion to the revoluble tool-supporting spindle. Figs. 27, 28, and 29 are detail elevations of parts seen in Fig. 26. Fig. 30 is an enlarged transverse vertical sectional view, taken on line 30 30, Fig. 3, illustrating particularly the flexible protector for preventing accumulation of chips, dust, &c., upon the top face of the guides for the movable bed-plate; and Figs. 31 and 32 are transverse vertical sectional views taken, respectively, on lines 31 31 and 32 32, Fig. 30.

A is any desirable construction of frame having guideways $a$, provided with the top bearing-face $a'$; B, a bed-plate having ribs $b$, movable in the guides $a$, and shoulders $b'$, to which the work may be secured, and C arms projecting upwardly from the frame on opposite sides of the bed and formed with guide-shoulders $c$ and guideways or chambers $c'$.

D is a cross-head having ways $d$, movable on the shoulders $c$, and longitudinal ribs $d'$, upon which is movable the carriage E for the revoluble tool-carrying spindle F.

G, Fig. 4, is the main shaft, having at one end a cone-pulley $g$, upon which runs a belt $g'$, Fig. 5, and at the other end a disk $g^2$, which communicates motion to a supplemental shaft H.

I is a second supplemental shaft connected at one extremity to the former shaft H and provided at the other end with a worm $i$, and I' is a cross-shaft journaled in the frame A with one end provided with a worm-wheel $i'$, engaged with the worm $i$, and the other with a driving-pinion $i^2$, which meshes with an idle intermediary $i^3$ of larger diameter engaged with a rack $i^4$ on the under side of the bed-plate F for moving the same backward and forward.

Since, as best seen in Figs. 1, 4, and 25, the cone $g$ on the main shaft G is on the opposite side of the machine to that upon which are the various wheels, levers, &c., for varying the movement and operation of the machine, it is very desirable to shift the belt $g'$ without passing to said opposite side of the machine. Consequently, as best seen in Fig. 25, I provide the shifting-lever G', having both extremities projecting beyond the side walls of the frame, one being provided with a handle G² and the other with a curved or inclined extension G³, which carries an arm G⁴, inclining toward the edge of the belt, and a second arm G⁵, having its base inclining toward the edge of the belt and its end G⁶ substantially parallel with the edge of the belt. By this peculiar construction of shifting-lever G' the belt may be readily forced from the opposite side of the machine to any desired shoulder $g^8$ of the cone $g$.

The supplemental shaft H is preferably inclined, as best seen at Fig. 2, lies in proximity to the disk $g^2$, with its upper extremity supported in a box $h$, having an adjusting-screw $h'$ and lock-nut $h^2$, Fig. 22, extends on opposite sides of the center of said disk, and is provided at its upper extremity with a frictional band H', having a suitable engaging periphery formed of rawhide or other desirable material adapted to engage a like face $g^4$, secured to the outer side of the disk $g^2$. The other extremity of said shaft H is journaled in boxes $h^3$ and $h^4$, the lower one having an adjusting-bolt $h^5$ and a lock-nut $h^6$, and is provided with a worm $h^7$, meshing with a worm-wheel $h^8$ upon a shaft $h^9$, journaled in the frame A.

As best seen at Figs. 4 and 22, the frictional band H' consists, preferably, of a ring or belt of rawhide movable on a drum H², rigidly secured to the elevated end of the supplemental shaft H and arranged directly opposite to the disk $g^2$, with a slight space between the two sufficient to prevent friction and permit sliding movement of the frictional band H' with a minimum degree of friction. The frictional band H' is, with the exception of the small portion in direct engagement with the adjacent face of the disk $g^2$, surrounded and shielded by a guide or guard H³, which is movable upon a guide-bar H⁴, supported at its opposite extremities in bearings H⁵ and H⁶.

It is evident that the position of the frictional band H' upon the drum H² varies the speed of the supplemental shaft without varying the speed of the main shaft and also varies the direction of movement of said shaft, since when the frictional band H' is in engagement with the disk $g^2$ near its periphery it revolves much faster than when in engagement with the same near its center, and when in engagement on one side of the center of the disk $g^2$ revolves in a different direction than when in engagement on the opposite side.

The frictional band H' is readily moved in its adjustment by engagement of the shield or guard H³, since the same does not revolve, but slightly twists the revolving belt or frictional band H', whereupon the revolution of the disk $g^2$ aids the frictional band H' in its movement, thus requiring a very slight force for adjusting said frictional band, which, when in position, is retained by an adjusting-screw H⁸, Fig. 2, bearing against the guide H⁴.

Should it be desired to stop the movement of the disk $g^2$ occasioned by its momentum after the communication of motion to the belt $g'$ is checked, or to at any time retard the movement of said disk $g^2$, I provide a brake H⁹, mounted on a lever H¹⁰, pivoted at H¹¹ and provided with a foot-piece H¹², as best seen at Fig. 2.

As shown at Fig. 23, the supplemental shaft I is also inclined, having its upper extremity pivoted in a bearing $i^5$, supported at $i^6$ upon the frame A, and receives motion from the shaft $h^9$ by gearing $i^7$. Its opposite end is mounted in a movable support $i^8$, Figs. 2 and 24, which is carried on one arm $i^9$ of a lever $i^{10}$, pivoted to the frame A at $i^{11}$, and, as previously stated, carries the worm $i$, which, when in its elevated position, engages with the worm-wheel $i'$, and, as previously described, transmits motion to the pinion $i^2$, and thence by the idle intermediary $i^3$ to the bed-plate.

The object of utilizing the large idle intermediary is to produce a steady and uniform movement, which cannot be occasioned by the direct engagement with the rack $i^4$ of a small pinion, as the pinion $i^2$.

At the upper extremity of the worm-wheel $i'$, and preferably on the outside of said extremity, for shielding the same I provide a cap or plate $i^{12}$, that carries a spindle $i^{13}$, having at one extremity a pinion $i^{14}$, Figs. 1 and 2, which engages with the worm-wheel $i'$, and at the other a crank $i^{15}$ for moving the bed-plate B backward and forward by hand when the worm $i$ is out of engagement with the worm-wheel $i'$.

For the purpose of firmly locking the bed-plate in its adjusted position I provide upon one of the arms $c$ of the frame a boss or bearing B', Figs. 1, 2, and 4, through which passes a bolt $B^2$, having its lower end $B^3$, Fig. 4, adapted to engage the under face of the bed-plate B and clamp the same against an overhanging shoulder $B^4$ of the boss B'.

The inner end of the movable screw J, mounted in a depending arm $j$ of the bracket $i^{12}$, is adapted to engage the teeth of the worm-wheel $i'$ and lock the same from movement.

As the bed is moved backward and forward a greater or less portion of the top face $a'$ of the guides $a$ is exposed beyond one of the ends of the bed, and chips, dust, &c., are liable to settle thereupon and cut this surface when the bed is returned. To obviate this, I removably secure to the ends of the bed by bolts $k$ a tool-box K, Figs. 1, 2, and 30, at the opposite extremities of which box are drums K', having wound thereon by a coil or other suitable spring $K^2$ a flexible belt $K^3$ of steel or other desirable material, to the free end of which is secured a plate $K^4$, having shoulders $K^5$ at its upper and lower extremities, one being adapted to engage the tool-box and the other the end of the frame A. The coil-spring normally winds said protector into its coiled position upon the drum K', and when the end of the bed-plate passes beyond the end of the frame and exposes a portion of the top face $a'$ of the guide $a$ the lower shoulder $K^5$ engages the adjacent end of the frame. As the bed continues its movement the protector covers the top face $a'$, being afterward forced to its normal position when the bed-plate is returned, and then disengaged from the frame should the bed-plate be forced in an opposite direction beyond the end of the frame.

From the foregoing it will readily be understood that the belt $g'$ is varied or shifted from the opposite side of the machine, the bed-plate B moved backward and forward by means of the supplemental shafts I and H, its speed and direction varied by the frictional band H', its movement stopped by disengagement of the worm $i$, whereupon said bed may be firmly locked in its adjusted position by the clamp $B^2$, and that the worm-wheel may be locked by the stop J or rotated by means of the lever $i^{15}$.

As previously stated, the cross-head D is movable on the frame-guides $c$, provided on the arms C, this movement being effected by a cross-shaft D', Fig. 6, journaled in said cross-head and provided at one end with a pinion $D^2$, that meshes with a gear $D^3$ upon the short cross-shaft $D^4$, having on its opposite end a pinion $D^5$, that meshes in a vertical rack $D^6$, Figs. 5 and 6, and thereby raises and lowers the cross-head D as the shaft D' is turned. A suitable scale $c^2$ on the guide $c$ enables the operator to readily determine when the cross-head is in the desired position.

Motion is communicated to the shaft D' by a vertical shaft L, having one end journaled in a step or arm of the bracket $h^4$ and the other in a bracket $l$, projecting from one end of the cross-head D. The lower end of the shaft L is connected by gearing L' to the shaft $h^9$, and its opposite end is provided with a feathered bevel-gear $L^2$, movable lengthwise on the shaft L and meshing with a like bevel-gear $L^3$ upon a spindle $L^4$, journaled in the cross-head D, whereby the cross-head may be adjusted without disengaging the gears $L^2$ and $L^3$. A spur-gear or pinion $L^5$ is also journaled on the spindle $L^4$, and conveys motion to a loose gear $e^6$, Figs. 15 and 16, movable lengthwise on the hub $e^5$ of a clutch-section $e^4$, locked to the shaft $e^3$ and rigidly secured to a second gear $e^7$, meshing with a loose gear $L^6$, movable lengthwise on the shaft D'. On the inner face of the gear $L^6$ is an engaging face $L^7$, adapted to be frictionally engaged by a movable shifter or clamp $L^9$ with a like face of a disk $L^8$, locked to the shaft D'. This shifter is also movable lengthwise on the outer end of the shaft D', is provided at one extremity with a hand-engaging portion $L^{10}$ and at the other with a screw-threaded socket $L^{11}$, adapted to engage screw-threads on said shaft, and is also provided with an annular groove $L^{12}$ for receiving an arm or shoulder $L^{13}$, formed upon one end of a series of pins $L^{14}$, Figs. 16 and 20, having their opposite extremity rigidly secured to the gear $L^6$.

A feathered washer $L^{15}$ intervenes between the adjacent faces of the gear $L^6$ and the clamp $L^9$, and prevents the constantly-rotating gear $L^6$ from causing the clamp to rotate and automatically force said gear into engagement.

From a consideration of the mechanism for raising and lowering the cross-head D it is evident that when the main shaft G is in motion the vertical shaft L is also revolved, and when the clamp $L^9$ has been operated to engage the gear $L^6$ with the disk $L^7$ the crosshead is moved up or down according to the direction of rotation of the vertical shaft L as governed by the position of the frictional band H' upon the adjacent disk $g^2$ previously described, whereas when the clamp $L^9$ is out of operative position the shaft L and the gear $L^6$ revolve without transmitting motion to the shaft D'.

In order to enable the cross-head D to be moved with as little power as possible, I provide a counterbalance M, Figs. 4 and 6, movable in the chamber $c'$ of the upright arms C and connected to said cross-head by means of a flexible belt M' of steel or other material, passed over a flat-faced pulley or wheel $m$, having projecting trunnions $m'$, movable in an elongated yoke or bearing $m^2$ upon an upwardly-projecting bracket $m^3$, secured to the arm C. This arm C is preferably provided with a counterbalance, and, owing to the rolling movement of the trunnions $m'$ in their bearing $m^2$, the cross-head in its movement requires hardly any perceptible power.

For the purpose of holding the cross-head in its adjustment I provide a lock N, adapted to be brought into and out of operative position by a movable rod $n$, Figs. 7 and 8.

The outer walls $d^2$ and $d^3$ of the ways $d$ of the cross-head are removably secured by screws $d^4$ to said head, the screws for the inner walls $d^3$ being so arranged that said walls have a slight movement thereon.

$n'$ represents an arm having one extremity secured to the inner walls $d^3$ and its other passed through the wall of the cross-head into its interior chamber $n^2$ and adapted to engage one extremity of a link N', having its other end engaged by a shoulder $N^2$ on the movable rod $n$. There are preferably one of these projections $n'$ for each of the inner walls $d^3$, and consequently two links N'. The shoulder $N^2$ for engaging the outer link N' is movable lengthwise on the rod $n$, being formed angular in cross-section and mounted in an angular recess $N^3$ in the outer face of said link for preventing its rotation on the rod $n$, and the other shoulder $N^2$ is rigidly secured to the rod $n$ and adapted to engage the outer face of the inner link N'.

The outer end of the rod $n$ projects beyond the cross-head D and is provided with a hand-engaging wheel $N^4$, whereby said rod may be rotated, whereupon the links N' are rocked by the lengthwise movement of the rod occasioned by its inner end screwing in the shoulder or nut $N^2$, and the inner ends of the projections $n'$ are drawn inwardly, thus firmly clamping the slightly-movable inner walls $d^3$ of the cross-head against the adjacent face of the guides $c$ on the frame-arm C and retaining the cross-head in its adjusted position.

It is very desirable that the mechanism for raising the cross-head up and down shall be prevented from movement when the same is firmly locked in its adjusted position. Consequently between said mechanism and the lock N, I interpose a connection O, which effects this desirable result, consisting, preferably, of a lever pivoted at $o$ and provided with two arms, one, $o'$, being adapted to encounter a movable shoulder or shoulders $o^2$ on the outer end of the rod $n$ and the other arm, $o^3$, the inner extremity of the movable clamp $L^9$ when the same is screwed outward into operative position, as shown at Fig. 8. There are preferably two of these shoulders movable lengthwise on guide-rods $o^4$, projecting from the outer wall of the cross-head and provided with central screw-threaded sockets, the inner one engaging right-hand threads and the opposite one left-hand threads in order that both shoulders may be drawn together by the rotation of the rod $n$, and thus prevent the entrance between said shoulders of the arm $o'$, whereupon the opposite arm $o^3$ of the lever O encounters the clamp $L^9$ and prevents its operation. On the contrary, when the rod $n$ is revolved in the direction suitable for releasing the lock N the shoulders $o^2$ are moved in opposite directions, and, as the clamp $L^9$ is screwed inwardly to operatively engage the gear $L^6$ and bring about the up-and-down movement of the cross-head, a rounded shoulder $o^5$ on the inner end of the hub of said clamp forces the arm $o^3$ of the lever O upwardly, and, as the shoulders $o^2$ are sufficiently separated to admit the opposite arm $o'$ of said lever, the same is rocked a sufficient distance to permit the operation of the clamp $L^9$.

During the subsequent up-and-down movement of the cross-head the arm $o'$ of the lever O lies between the shoulders $o^2$, and consequently the rod $n$ is prevented from a sufficient lengthwise movement to force the lock N into operative engagement, thus preventing any accident to the machine from a mistake of the operator.

It will be particularly noted that the thread engaged by the inner shoulder $o^2$ is of greater pitch than the other thread in order to permit the rapid approximation of said shoulders and prevent the inner one from being clamped against the adjacent wall of the cross-head by the lengthwise movement of the rod $n$.

The tool-support carriage E, as previously stated, is movable transversely of the bed-plate along guide-ribs $d'$ upon the cross-head, being formed with guideways $e$, adapted to receive said ribs, and removable walls $e'$ for bearing against the rear face of the guide-ribs, one of said walls being provided with an eye $e^2$, having a screw-threaded socket through which passes the feeding-screw $e^3$.

As shown at Figs. 2, 15, and 16, the outer end of this feeding-screw projects beyond the end of the cross-head, and is provided with a clutch-section $e^4$, locked thereon and formed with an outwardly-projecting hub $e^5$.

Loosely journaled on the hub $e^5$ is the spur-gear $e^6$ previously described in connection with the mechanism for raising and lowering the cross-head, and rigidly secured thereto is a second gear $e^7$, meshing with the gear $L^6$ for transmitting motion to the mechanism for raising and lowering the cross-head when the gear $L^6$ is locked to its engaging clutch-section.

The gear $e^6$ is movable lengthwise on the projecting hub of the clutch-section $e^4$, and is provided with an engaging face $e^8$, adapted to be firmly locked to said clutch-section by the movement of a shifter or clamp $e^9$, movable on the screw-threaded end $e^{10}$ of the feed-screw $e^3$.

As previously described in connection with the shifter $L^9$ for locking the gear $L^6$ to the shaft $D'$, a washer $e^{11}$ intervenes between the adjacent faces of the clamp $e^9$ and the loose gear $e^6$, and the inner end of the clamp $e^9$ is provided with a groove $e^{12}$, adapted to receive a shoulder $e^{13}$ on a pin $e^{14}$, having at its opposite end a shoulder $e^{16}$ for engaging the inner face of the hub of the gear $e^6$.

As shown at Fig. 17, there are three of these pins $e^{14}$, and it is evident that, as the clamp is screwed inwardly, the gear $e^6$ is locked to the feed-screw $e^3$, whereupon the head or carriage E is moved along its guide-ribs $d'$, it being understood that the clamp $L^9$ for throwing into action the mechanism for raising and lowering the cross-head is usually out of operation when the head or carriage is being moved by the feed $e^3$.

P, Figs. 1 and 2, represents a scale in the outer face of the cross-head for indicating the degree of adjustment of the tool-support carriage, and $P'$, Figs. 13 and 14, represents movable gibs interposed between the adjacent faces of the tool-support carriage and the cross-head guides $d'$ for taking up all wear. These gibs are provided with a shoulder $p$, which is engaged by one extremity of a clamp $p'$, having its opposite end screw-threaded and movable in a socket $p^3$, formed in the carriage.

The tool-support F preferably consists of a revoluble spindle formed tapering for the sake of easily taking up all wear, and is mounted in a tapering bearing $E^2$ in the carriage or head E, with its upper end projecting beyond said carriage, being secured in operative position by a pair of nuts $f$, mounted on said projecting end and resting upon a top shoulder of the head E.

At the lower extremity of the spindle are screw-threads $F'$ or other suitable shoulders to which a suitable tool may be readily secured.

For the purpose of rendering the tool-support particularly applicable for the attachment of a varied number of tools it is formed at its lower extremity with a central tapering socket $F^2$, adapted to receive either the shank of a tool or the shank of an auxiliary tool-support $F^3$, either of which shanks may be secured in operative position by a bolt $F^4$, having its upper end provided with a shoulder superimposed upon the top face of the tool-supporting spindle, and its lower end screw-threaded and adapted to engage the upper end of said shank and draw the same firmly into position.

The spindle F is revolved by a horizontal shaft R, journaled in the cross-head, driven, as presently described, from the main shaft and suitably connected to the spindle for rotating the same at the desired degree of speed.

I prefer to have a differential-speed mechanism between the shaft R and the spindle F for driving said spindle at differential speeds, and with this end in view mount upon said spindle one above the other a worm-wheel $F^5$ and a spur-gear $F^6$, secured in position by a clamp $f'$ and adapted to respectively engage a feathered worm $F^7$ upon the shaft R, and intermediary gearing $F^8$, engaged with a bevel-gear $F^9$ on the shaft R, Figs. 3, 6, 7, 9, and 10.

As preferably arranged the worm-wheel $F^7$ is formed with right-hand threads, is movable lengthwise of the shaft R, and bears at its rear side against a shoulder $F^{10}$, being adapted to revolve the tool-carrying spindle at a less speed than the bevel-gear $F^9$ and the intermediary gearing $F^8 F^8$, whereupon when, as presently described, said bevel-gear and intermediary gear are thrown into action, the spindle, being revolved with greater speed, automatically throws the worm out of operative engagement. After proper disengagement of the bevel-gear $F^9$ and intermediary gear $F^8$ the worm may be again forced into action by means of a lever $f^3$, pivoted at $f^4$, with one end adapted to encounter the front side of said worm and the other projecting to the outside of the head E.

The hub of the gear $F^9$ is formed with an annular groove $f^5$, in which rides a yoke $f^6$, Fig. 11, to which is eccentrically pivoted at $f^7$ a lever $f^8$, having a hand-engaging arm $f^9$ on the outside of the head E. This lever $f^8$ serves to engage said gear $F^9$ with the intermediary gearing $F^8$ when desired to revolve the tool-spindle at greater speed and to disengage the same when desired to bring the worm $F^7$ into action.

It will thus be evident that by manipulation of the handles $f^3$ and $f^9$ of the tool-carriage support the spindle F may be revolved with dissimilar speed, the mechanism of less speed automatically forced out of action by the movement of the lever $f^8$ and then operatively engaged after disengagement of the mechanism of greater speed, and that the peculiar construction of the spindle and its gearing enables all wear to be readily taken up and renders the same capable of continued and severe use.

The revolution of the shaft R for effecting the movement of the tool-supporting spindle is produced by an inclined intermediary shaft S, having one end supported in a sleeve $S'$, journaled on a bracket $S^2$, Figs. 5, 26, 27, 28, and 29, projecting from the main frame, and its opposite end supported in a bracket $R'$, journaled on the projecting end of the shaft R.

Bevel-gearing R² transmits motion from the main shaft to the lower end of said inclined intermediary, and bevel-gears R³ and R⁴ transmit motion from the intermediary to the shaft R, the gear R³ being movable lengthwise on the shaft S. By this peculiar construction and arrangement of the parts the greater part of the shaft S, and the gear supported thereon, is carried by the frame A of the machine itself instead of by the main shaft, thus relieving said main shaft of a great deal of strain and wear, and owing to the peculiar pivotal support for the lower end of the shaft and the sliding gear at its upper extremity the shaft automatically adjusts itself to the elevation of the cross-head D and revolves the tool-supporting spindle by means of the shaft R and the connections therefrom to said spindle with as much ease and absence of undue friction at one elevation as another.

The operation of my invention will be readily perceived from the foregoing description and upon reference to the drawings, and it is evident that the tool-carrying spindle is driven from one side of the main shaft and the movement of the bed-plate, cross-head, and carriage for the tool-spindle effected by connections from the opposite side of the main shaft, and that the capacity of the machine is very great, since the feed-bed may be moved backward and forward, the cross-head up and down, the carriage for the tool-carrying spindle transversely of the bed-plate, and the tool-carrying spindle revolved to bring into action any suitable tool supported thereon, as a series of planing-tools arranged in a circle, a single planing-tool, milling-cutters, drills, taps, &c. Moreover the speed of all of these parts can be varied at will to accommodate the machine to the character of work, and owing to the peculiar construction and adaptation of the parts the machine is extremely simple, durable, and readily handled.

It is evident that considerable change may be made in the relative construction and arrangement of the parts of my traversing-machine. Hence I do not limit myself to their exact detail construction.

Having thus fully described my invention, what I claim as new, and desire to secure by Letters Patent, is—

1. In a traversing-machine, the combination of a frame, a longitudinally-movable bed-plate, a cross-head supported above the bed-plate, and movable toward and away from the same, a revoluble tool-carrying spindle carried by the cross-head and movable lengthwise thereof and transversely of the bed-plate, a movable rod, links interposed between said cross-head and movable rod for holding the cross-head in its adjusted position, and a driving-shaft connected to said spindle for revolving the same, substantially as and for the purpose described.

2. In a traversing-machine, the combination of a frame having a movable bed-plate; of a tool-carrying spindle mounted above the bed-plate, a cross-head for supporting the spindle, a counterbalance for the cross-head and spindle, a connection between the counterbalance and the cross-head, a wheel over which said connection is passed provided with a trunnion, and a yoke for supporting the trunnion and permitting rolling movement thereof when the spindle is adjusted, substantially as and for the purpose described.

3. In a traversing-machine, the combination of a frame having a movable bed-plate, a revolving spindle mounted above the bed-plate, a movable cross-head for supporting the spindle and raising and lowering the same, a wheel having a trunnion, an elongated bearing for the trunnion adapted to permit the same to roll therein, a counterbalance for the cross-head and spindle, and a flexible connection between the counterbalance and said cross-head adapted to pass over said wheel, substantially as and for the purpose specified.

4. The combination with a frame having upwardly-projecting arms and a bed-plate movable between said arms; of a revolving vertically-arranged tool-carrying spindle mounted above the movable bed-plate, a cross-head movable on the upwardly-projecting arms, a pair of wheels having trunnions, elongated bearings provided on the projecting frame-arms for supporting the trunnions and permitting rolling movement of the same, guides in the arms, counterbalances movable in said guides, and connections between said cross-head and counterbalances adapted to be passed over said wheels, substantially as and for the purpose set forth.

5. In a traversing-machine, the combination with a frame having upwardly-projecting arms and a bed-plate movable between said arms; of a cross-head guided on the arms, gearing for raising and lowering said cross-head, a revolving tool-carrying spindle mounted on the cross-head, elongated bearings on the arms, a wheel having a trunnion supported on said bearing so as to roll thereon, a counterbalance, and a connection between said counterbalance and cross-head adapted to be passed over said wheel, substantially as and for the purpose described.

6. In a traversing-machine, the combination with a frame and a movable bed-plate; of a cross-head supported above the bed-plate, gearing for raising and lowering said cross-head, a revolving tool-carrying spindle mounted on the cross-head, gearing for revolving the spindle, gearing for revolving the spindle at a greater speed than the former gearing, and connections between the two sets of gearing whereby the latter gearing automatically throws the former gearing out of operative engagement, substantially as and for the purpose set forth.

7. In a traversing-machine, the combination with a frame having upwardly-projecting arms and a bed-plate movable between said arms; of a cross-head guided on the arms, gearing for raising and lowering said cross-head, a revolving tool-carrying spindle mounted on the cross-head, gearing for moving the spindle transversely on the cross-head, a gage for indicating the degree of movement of the spindle, gearing for revolving the spindle, gearing for revolving the spindle at a less speed than the former gearing, a shifter between the two sets of gearing, elongated bearings supported on the arms, wheels having trunnions supported on said bearings so as to roll thereon, counterbalances, and connections between said counterbalances and the cross-head adapted to be passed over said wheels, substantially as and for the purpose set forth.

8. In a traversing-machine, the combination of a frame having a movable bed-plate, a tool-carrying spindle mounted above the bed-plate, a pair of wheels on the spindle, one above the other, gearing connected to one wheel for revolving the spindle, gearing connected to the other wheel for revolving the spindle at a greater speed than the former gearing, and connections between the two sets of gearing whereby the latter gearing automatically throws the former gearing out of operative engagement, substantially as and for the purpose specified.

9. In a traversing-machine, the combination of a frame having a movable bed-plate, a tool-carrying spindle mounted above the bed-plate, a pair of wheels mounted on the spindle one above the other, a shaft journaled in proximity to the spindle for communicating motion thereto, a worm movable lengthwise of the shaft and adapted to engage one of said gears and to be automatically disengaged therefrom, and intermediary gearing between the other of said gears on the spindle and said shaft for revolving said spindle at a speed dissimilar from its speed produced by the worm, substantially as set forth.

10. In a traversing-machine, the combination of a frame having a movable bed-plate, a tool-carrying spindle mounted above the bed-plate, a pair of wheels mounted on the spindle one above the other, a shaft journaled in proximity to the spindle for communicating motion thereto, a worm movable lengthwise of the shaft and adapted to engage one of said gears and to be automatically disengaged therefrom, a lever for engaging said worm and forcing the same into engagement with said wheel, a gear-wheel also movable lengthwise of said shaft, an eccentric for shifting said gear-wheel, and an intermediary gear between said movable gear-wheel and the other of said wheels secured upon the tool-carrying shaft, substantially as and for the purpose described.

11. In a traversing-machine, the combination with a frame having a movable bed-plate and a cross-head movably mounted above said bed-plate; of a worm-wheel and gear mounted on said spindle one above the other, a nut on the spindle for securing the same to the cross-head, a second nut on the spindle for securing the worm-wheel and gear in position, a shaft for communicating motion to the spindle, a worm movable on said shaft for engaging the worm-wheel, a gear-wheel movable on the shaft, intermediary gearing between the latter gear-wheel and the gear on the spindle, and shifters for throwing said movable worm and gear into operative engagement, substantially as and for the purpose specified.

12. In a traversing-machine, the combination with a frame having a movable bed-plate and a cross-head, a tool-support mounted above the bed-plate, a carriage for said support guided on the cross-head, a pair of shafts, gearing between said shafts for alternately driving the same, a disengager for disengaging one of the shafts from its actuating-gear during the movement of the other shaft, and gearing between the respective shafts for raising and lowering the cross-head and for moving the tool-support carriage along the cross-head, substantially as set forth.

13. In a traversing-machine, the combination with a frame having a movable bed-plate and a cross-head, a tool-support mounted above the bed-plate, a carriage for said support guided on the cross-head, a pair of shafts, a clutch-section on the respective shafts, movable gear-wheels on the respective shafts adapted to engage the respective clutch-sections, an intermediary gear mounted on one of said shafts and adapted to engage the gear on the other shaft for transmitting motion from one shaft to the other, movable clamps for engaging the movable gears with their respective clutch-sections, and gearing between the respective shafts for raising and lowering the cross-head and for moving the tool-support carriage along the cross-head, substantially as set forth.

14. In a traversing-machine, the combination of a frame having a bed-plate, a cross-head guided on said frame, a carriage movable along on the cross-head, a tool-support mounted on the head, clamps for locking the cross-head to the frame, a rod for operating said clamps, a movable shoulder on said rod, mechanism for moving the carriage along the cross-head, a shifter for forcing said mechanism out of action, and a connection between said shifter and shoulder for preventing the operation of the shifter when the cross-head is locked to the frame, substantially as and for the purpose specified.

15. In a traversing-machine, the combination of a frame having a bed-plate, a cross-head guided on said frame, a carriage movable along the cross-head, a tool-support mounted on the carriage, a movable shoulder on the cross-head, a projection secured to said shoulder, a rocking link having one end engaged with said projection for drawing the movable shoulder against the frame and firmly locking the cross-head in position, a rod engaged with the opposite end of said rocking lever for operating the same, a shoulder on said rod, mechanism for moving the carriage along the cross-head, a shifter for forcing said mechanism out of action, and a connection between said shifter and shoulder for preventing the operation of the shifter when the cross-head is locked to the frame, substantially as set forth.

16. In a traversing-machine, the combination of a frame having a bed-plate, a cross-head guided on said frame, a carriage movable along the cross-head, a tool-support mounted on the carriage, a pair of movable shoulders on the cross-head, projections from said shoulders, rocking links having one end engaged with said projections for drawing the movable shoulders against the frame and firmly holding the cross-head in position, a rod having shoulders engaged with the opposite ends of said locking-levers, one of said shoulders being movable on the rod, an additional shoulder on said rod, mechanism, substantially as described, for moving the carriage along the cross-head, a shifter for throwing said mechanism into action, and a connection adapted to encounter said additional shoulder and prevent the movement of said shifter, substantially as specified.

17. In a traversing-machine, the combination of a frame having a bed-plate, a cross-head guided on said frame, a carriage movable along the cross-head, a tool-support mounted on the carriage, a pair of movable shoulders on the cross-head, projections from said shoulders, rocking links having one end engaged with said projections for drawing the movable shoulders against the frame and firmly holding the cross-head in position, a rod having shoulders engaged with the opposite ends of said locking-levers, one of said shoulders being movable on the rod, a pair of additional shoulders mounted on said rod and movable toward and away from each other, mechanism, substantially as described, for moving the carriage along the cross-head, a shifter for bringing said mechanism into action, and a lever having one arm adapted to encounter said additional shoulders when approximated, and another arm adapted to encounter the shifter and prevent the same from operation, substantially as set forth.

18. In a traversing-machine, the combination of a frame having a bed-plate, a cross-head guided on said frame, a shaft carried by the cross-head, a tool-carrying spindle connected to said shaft, a main shaft journaled in the frame, a bracket projecting from the frame, a sleeve hinged on said bracket, an intermediary shaft between the shaft journaled in the cross-head and the main shaft, supported in said sleeve, and gearing between the intermediary and the main and cross shafts, substantially as and for the purpose described.

19. In a traversing-machine, the combination of a frame having a bed-plate, a cross-head movable vertically on the frame, a main shaft journaled in the frame, a counter-shaft journaled in the cross-head, a tool-carrying spindle connected to said shaft, an intermediary shaft between the counter-shaft and the main shaft, a gear movable lengthwise of the intermediary shaft adapted to engage a corresponding gear on the counter-shaft, a sleeve having one extremity pivoted to the frame and the other adapted to support the intermediary shaft, and gearing between the main and intermediary shafts, substantially as and for the purpose described.

20. In a traversing-machine, the combination with a frame having a bed-plate and a support projecting upwardly above the bed-plate, a cross-head movable vertically on said support, a shaft journaled in the cross-head, a tool-carrying spindle connected to said shaft, a rack on said support, gearing between the cross-head and rack for raising and lowering the cross-head, a main shaft at one side of a perpendicular to the shaft in the cross-head, and an inclined intermediary shaft having one extremity hinged and connected, substantially as described, to the main shaft, and a movable gear on the other extremity of the intermediary shaft connected, substantially as described, to the shaft in the cross-head, substantially as and for the purpose set forth.

21. In a traversing-machine, the combination with a frame having a bed-plate and a support projecting upwardly above the bed-plate, a cross-head movable vertically on said support, a shaft journaled in the cross-head, a tool-carrying spindle connected to said shaft, a rack on said support, gearing between said cross-head and rack for raising and lowering the cross-head, a main shaft in the cross-head, an intermediary shaft having one extremity hinged to the frame, gearing between said hinged extremity of the intermediary shaft and the main shaft, a movable gear on the opposite extremity of the intermediary shaft, and gearing, substantially as described, between said movable gear and the shaft journaled in the cross-head, substantially as and for the purpose described.

22. In a traversing-machine, the combination of a frame having a bed-plate, a cross-head movable to and fro on the frame above the bed-plate, a main shaft, a cross-shaft journaled in the cross-head, a rack on the frame, gearing between said rack and cross-shaft, a vertical shaft connected, substantially as described, to the cross-shaft and the main shaft, a lock for holding said cross-head in its adjusted position, and a connection between said lock and the cross-shaft for preventing action of one when the other is in operation, substantially as described.

23. In a traversing-machine, the combination of a frame having a bed-plate, a cross-head movable to and fro on the frame above the bed-plate, a main shaft, a cross-shaft journaled in the cross-head, a rack on the frame, gearing between said rack and cross-shaft, a vertical shaft connected, substantially as described, to the cross-shaft and the main shaft, a revoluble spindle movable along the cross-head, a shaft connected, substantially as described, to said spindle and intermediary shaft, for moving the spindle along the cross-head, and a shifter for throwing the latter shaft out of operation when the former shaft journaled in the cross-head is in action, substantially as specified.

24. In a traversing-machine, the combination of a frame having a bed-plate, a cross-head movable to and fro on the frame above the bed-plate, a main shaft, a cross-shaft journaled in the cross-head, a rack on the frame, gearing between said rack and cross-shaft, a vertical shaft connected, substantially as described, to the cross-shaft and the main shaft, a lock for holding said cross-head in its adjusted position, a revoluble spindle movable along the cross-head, and a shaft connected, substantially as described, to said spindle and intermediary shaft for moving the spindle along the cross-head, substantially as specified.

25. In a traversing-machine, the combination of a frame having guides, a cross-head movable on said guides, a main shaft, a disk carried by the main shaft, a supplemental shaft extending transversely across the face of the disk in proximity thereto, a drum on said supplemental shaft, a frictional band movable lengthwise of the drum for engaging the disk and transferring motion from the main shaft to said supplemental shaft, and connections, substantially as described, between said cross-head and supplemental shaft for raising and lowering the same, substantially as and for the purpose described.

26. In a traversing-machine, the combination of a frame having guides, a cross-head movable on said guides, a tool-support carriage guided on the cross-head, a main shaft journaled in the frame, a disk on the shaft having one side adapted to form an engaging face, a supplemental shaft extending transversely across the face of the disk in proximity thereto, a drum on said supplemental shaft, a frictional band movable lengthwise of the drum for engaging the face of the disk, a movable guard encircling a portion of said band, and connections, substantially as described, between said supplemental shaft and tool-support carriage carried by the cross-head, substantially as and for the purpose set forth.

27. In a traversing-machine, the combination of a frame having two sets of guides, a bed-plate movable on one set, a cross-head movable on the other set, a pair of shafts connected, substantially as described, for moving said bed-plate and cross-head lengthwise of their guides, a main shaft journaled in the frame, a disk having one side adapted to form an engaging face, a supplemental shaft, a frictional band movable on the supplemental shaft and adapted to engage the former disk, and connections, substantially as described, between the shafts for conveying motion to the bed-plate and to the cross-head, substantially as set forth.

28. In a traversing-machine, the combination of a frame having two sets of guides, a bed-plate movable on one set, a cross-head movable on the other set, a tool-support carriage movable along the cross-head, a main shaft journaled in the frame, shafts connected, substantially as described, for moving the bed-plate, cross-head, and tool-support carriage, lengthwise of their guides, a main shaft journaled in the frame, a disk secured to said shaft and having one side adapted to form an engaging face, a supplemental shaft, a frictional band on the supplemental shaft adapted to engage the former disk, and connections, substantially as described, between the supplemental shafts and the shafts for moving the bed-plate, cross-head and tool-support carriage, substantially as specified.

29. In a traversing-machine, the combination of a frame having a movable bed, a main shaft, a cross-shaft connected, substantially as described, for moving the bed on its guides, an intermediary shaft connected, substantially as described, to the main shaft and cross-shaft, and having one extremity movable toward and away from the cross-shaft for disengaging the same, and a movable support for the movable extremity of said intermediary shaft, substantially as specified.

30. The combination with a carriage and ways in which said carriage is adapted to move; of a flexible apron secured at one end to the carriage and adapted to be drawn over the ways, substantially as and for the purpose specified.

31. In combination, a frame having a guide provided with a top bearing-face, a bed-plate movable on said top bearing-face, and a flexible ribbon having one end secured to said bed-plate and the other adapted to engage the frame and cover that portion of the top bearing-face exposed by the movement of the bed-plate, substantially as set forth.

32. In combination, a frame having a guide provided with a top bearing-face, a bed-plate movable on said top bearing-face, a drum journaled in the bed-plate, a flexible ribbon wound on said drum, a plate secured to said ribbon with one extremity adapted to engage the bed-plate and the other the frame, and a spring for winding said ribbon upon the drum, substantially as described.

In testimony whereof I have hereunto signed my name, in the presence of two attesting witnesses, at Syracuse, in the county of Onondaga, in the State of New York, this 15th day of June, 1891.

JOHN E. SWEET.

Witnesses:
CLARK H. NORTON,
L. M. BAXTER.